Figure 1:
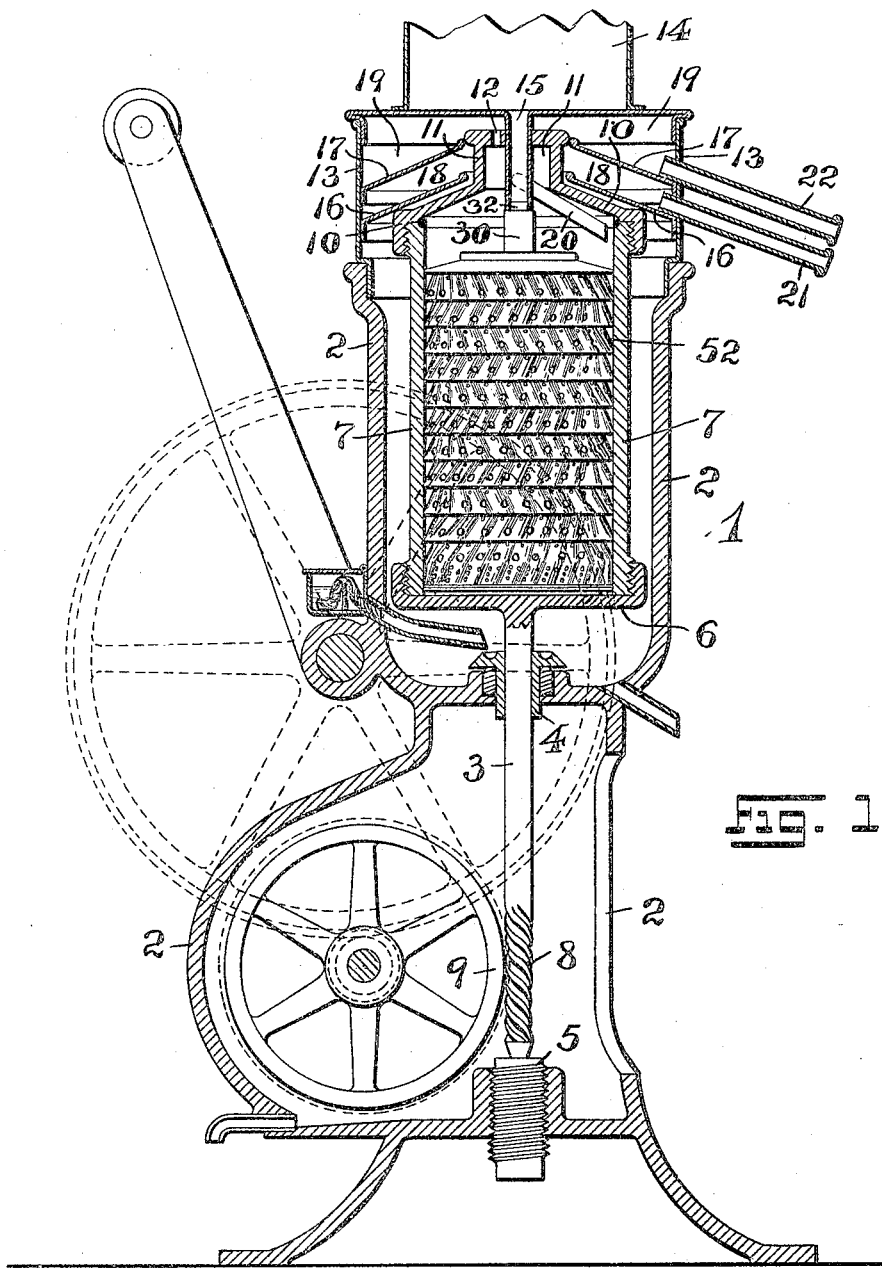

No. 801,997. PATENTED OCT. 17, 1905.
J. LAURELL.
CENTRIFUGAL CREAM SEPARATOR.
APPLICATION FILED MAR. 24, 1905.

4 SHEETS—SHEET 1.

WITNESSES
Geo. D. Richards
Harry G. Hatten

INVENTOR:
John Laurell,
BY
Fredk. Fraentzel,
ATTORNEY

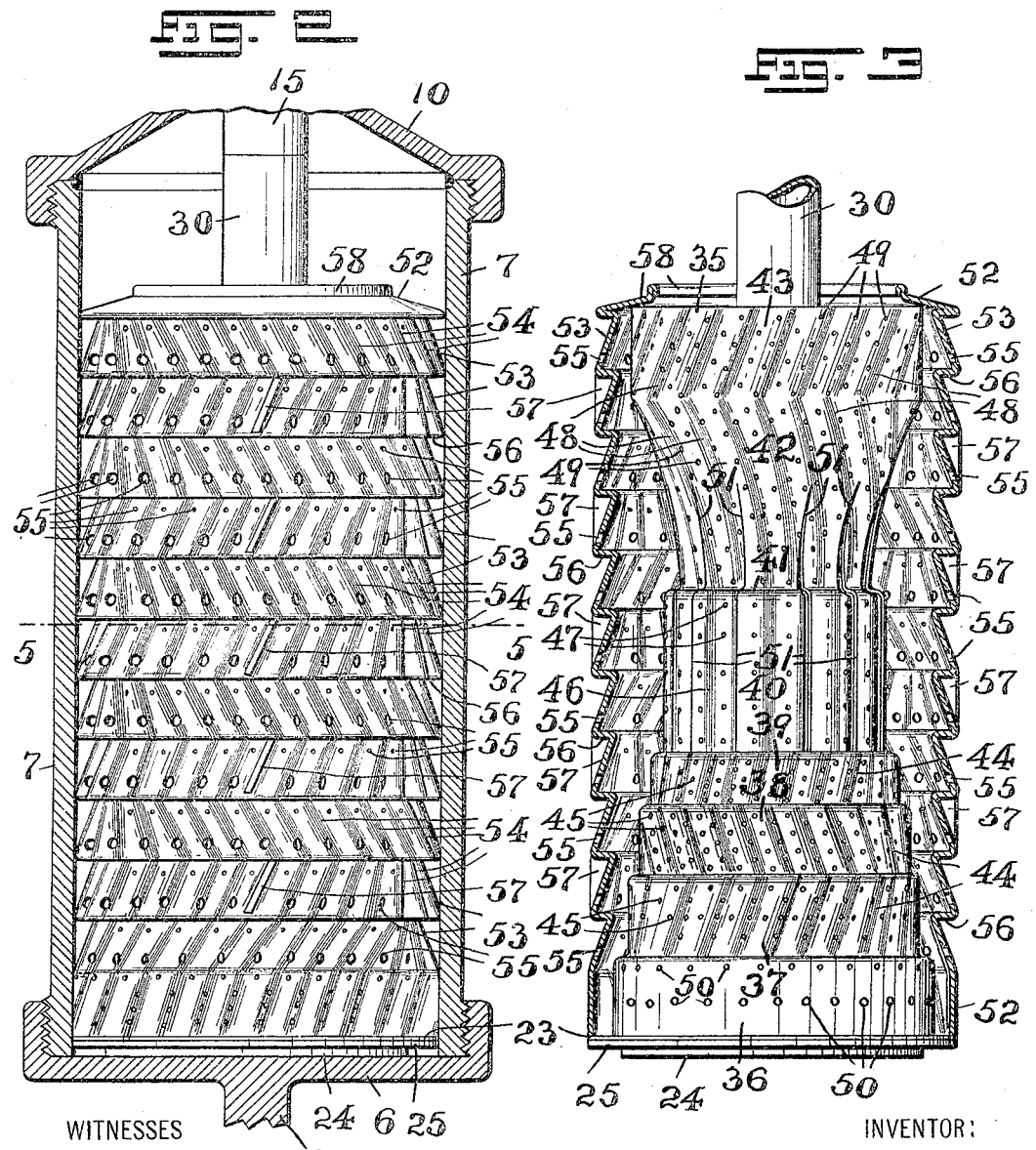

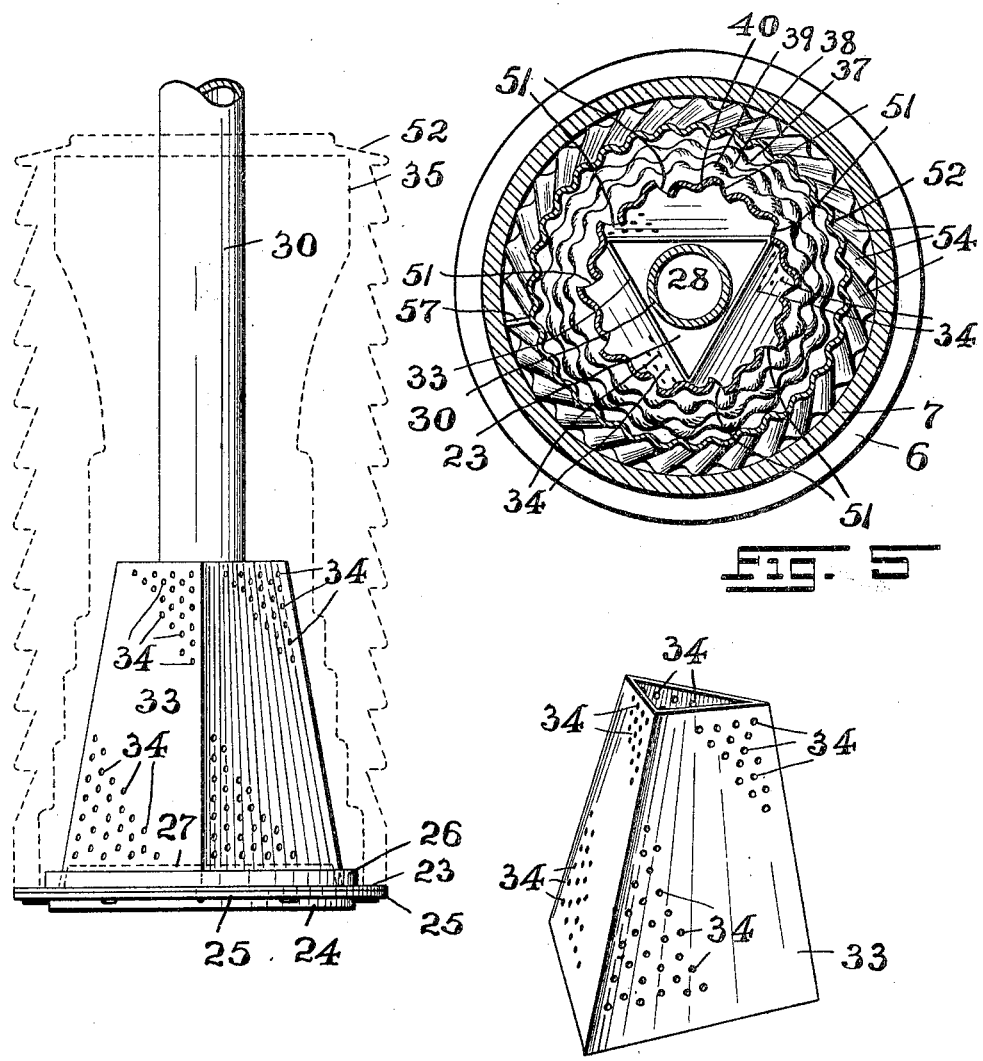

No. 801,997. PATENTED OCT. 17, 1905.
J. LAURELL.
CENTRIFUGAL CREAM SEPARATOR.
APPLICATION FILED MAR. 24, 1905.

4 SHEETS—SHEET 4.

WITNESSES
Geo. L. Richards
Harry G. Halton

INVENTOR:
John Laurell,
BY
Fred'k C. Fraentzel.
ATTORNEY

UNITED STATES PATENT OFFICE.

JOHN LAURELL, OF NEWARK, NEW JERSEY.

CENTRIFUGAL CREAM-SEPARATOR.

No. 801,997. Specification of Letters Patent. Patented Oct. 17, 1905.

Application filed March 24, 1905. Serial No. 251,750.

*To all whom it may concern:*

Be it known that I, JOHN LAURELL, a citizen of the United States, residing at Newark, in the county of Essex and State of New Jersey, have invented certain new and useful Improvements in Centrifugal Cream-Separators; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates generally to that class of machines or apparatus known as "cream-separators;" and my present invention is in the nature of an improved cream-separator in which the cream is separated from the milk by centrifugal force, the separated cream and milk after separation passing to the upper portion of the machine into separate discharge-ducts for the collection of the cream and milk in separate vessels.

This invention has for its principal objects to provide a simply-constructed apparatus for more readily separating the heavier milk from the lighter cream with a view of providing a more efficient and effectively-operating mechanism to secure an increased output of cream from a given quantity of milk and absolutely separate all the cream from the milk.

A further object of this invention is to provide a novel arrangement and construction of a series of separably-disposed cream-separating devices, which I shall hereinafter term the "liners," all arranged that they will break up the whole milk into thin streams or jets passing from one liner to another liner, whereby the cream globules or particles are brought in contact with the creaming-surfaces of the liners and being lighter than the milk pass back to the central portion of the main creaming cylinder or bowl to be finally conducted into the cream-outlet of the apparatus.

Other objects and resulting advantages of this invention not at this time more particularly mentioned will be clearly understood from the following detailed description of the devices and parts of the apparatus.

With the various objects of my present invention in view the said invention consists, primarily, in the novel centrifugal cream-separator hereinafter more fully set forth; and, furthermore, this invention consists in the various arrangements and combinations of the devices and parts, as well as in the details of the construction of the same, all of which will be fully described in detail in the following specification and then finally embodied in the clauses of the claim, which are appended to and which form an essential part of said specification.

The invention is clearly illustrated in the accompanying drawings, in which—

Figure 7:
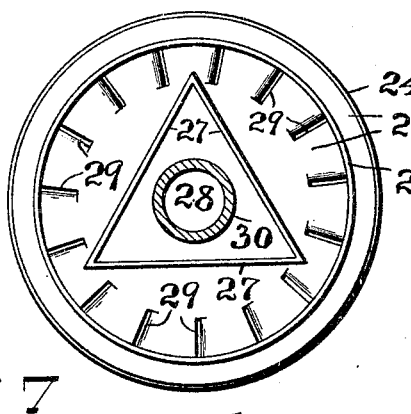
Figure 8:
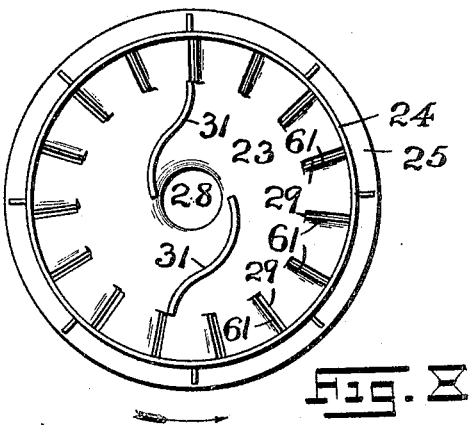
Figure 9:
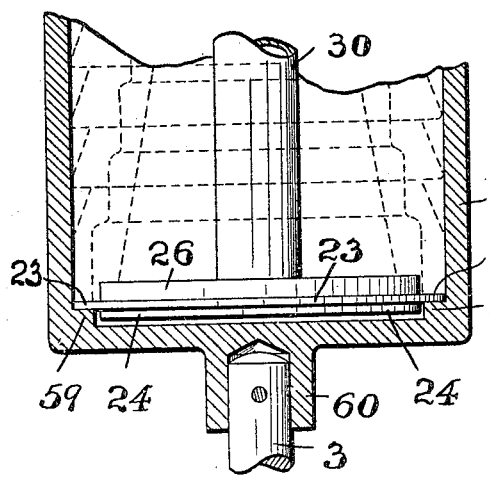
Figure 10:
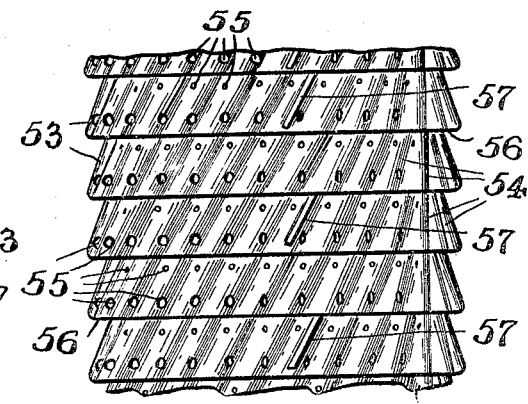
Figure 11:
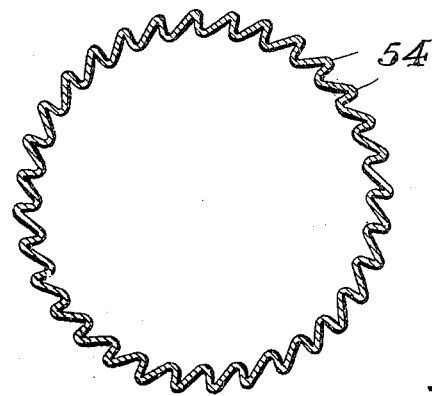

Figure 1 is a central vertical section of a complete centrifugal machine provided with a creaming cylinder or bowl and a series of nested liners therein, all embodying the principles of my present invention. Fig. 2 is a central vertical section of the creaming cylinder or bowl and an elevation or front view of the outer liner, in which are nested other liners, the said view being made on an enlarged scale. Fig. 3 is a central vertical section of the said outer liner and the next inner or immediate liner, the latter being shown in elevation in its operative position within the said outer liner. Fig. 4 is a front view of the innermost liner and a portion of a tubular milk-conveying spindle, both the outer and intermediate liners being diagrammatically indicated in dotted outline. Fig. 5 is a horizontal section of the various parts in their assembled relation, the said section being taken on line 5 5 in said Fig. 2; and Fig. 6 is a perspective view of the said innermost liner. Fig. 7 is a transverse section of the main tubular spindle and top view of a support upon the lower portion of said spindle for the arrangement thereon of the liners, the said liners, however, being omitted from said view; and Fig. 8 is a bottom view of the same. Fig. 9 is a detail sectional representation of the creaming cylinder or bowl and side view of the main tubular spindle and a support thereon, said view showing a slightly-modified arrangement of the said parts. Fig. 10 is a face view of a portion of an outer liner, the same being provided with creaming-surfaces of a modified construction, but still embodying the leading features of my present invention; and Fig. 11 is a transverse sectional representation of an outer liner provided with still another modified arrangement of creaming-surfaces.

Similar characters of reference are employed in the above-described views to indicate corresponding parts.

Referring now to the several figures of the drawings, the reference character 1 indicates the complete centrifugal cream-separator, the same comprising a suitable frame or case 2 and a vertical shaft 3, rotatably arranged in bearings 4 and 5, the said shaft being provided at its upper end with a receiving-head 6, which carries the creaming cylinder or bowl 7. The lower end portion of the said shaft 3 is made with a worm 8, which is engaged by a suitable driving-wheel or worm-gear 9, which in turn is operated in any usual manner by suitable actuating means, as will be clearly evident from an inspection of Fig. 1 of the drawings. Suitably arranged and secured upon the upper end of the said creaming cylinder or bowl 7 is a cap 10, preferably of the shape shown in Fig. 1 of the drawings, the said cap having a cylindrical part 11 and a cream-ejecting duct or perforation 12.

Suitably arranged upon the upper and open end portion of the said frame or case 2 is a receiver 13, preferably made from sheet metal, the same being provided with a milk-receiving chamber 14 for receiving the whole milk and a downwardly-extending duct or tube 15. Within the main body of the said receiver 13 are a pair of slanting partitions 16 and 17, the same being secured in position within the receiver 13 and surrounding the outer cylindrical surface of the part 11, substantially as shown, and thus providing two chambers 18 and 19. Leading from the upper inner portion of the said creaming cylinder or bowl 7 are one or more milk-conveying tubes 20, said tubes extending through the walls of the part 11 into the chamber 18, while the cream-ejecting duct 12 establishes communication with the chamber 19. Extending from the chamber 18 is an outlet or spout 21, and from the said chamber 19 extends a second outlet or spout 22.

Referring now more particularly to Figs. 1 and 2 of the drawings, it will be seen that the said head 6, the cylinder 7, and the head therefor produce a complete bowl, which has a revolving motion simultaneously with that of the shaft 3, the connected parts being readily separable for cleaning purposes. Resting within the lower portion of the said creaming cylinder or bowl 7 and upon the upper surface of the receiving-head 6 is a supporting plate or disk 23, which is provided upon its under surface with an annular rib 24 and a rubber gasket or packing-ring 25 and upon its upper surface with an annular rib 26 and a triangularly-shaped rib 27. The said supporting-plate 23 is made with a central opening 28, and extending radially from the said ribs 24 and 26 toward the said opening 28 and in the body of the said supporting plate or disk 23 are suitably-formed openings or slits 29. Extending in an upward direction from the upper surface of the said plate or disk 23, with its lower end portion arranged around the marginal edge portion of the said plate or disk 23, which forms said opening 28, is a tubular rod or pipe 30, having its upper end suitably connected with the duct 15, so as to establish a direct communication through said rod or pipe 30 between the milk-receiving chamber 14 and the under and slightly-chambered portion of the said supporting plate or disk 23, formed by the annular rib 24 and said under surface. Suitable deflecting ribs 31 may also extend downwardly from the under surface of the said supporting plate or disk 23, as shown in Fig. 8 of the drawings. From an inspection of Fig. 1 it will be seen that the upper end portion 32 of the said hollow rod or pipe 30 is slightly reduced, said end portion 32 extending loosely into the lower portion of the duct 15, whereby the turning motion of the pipe 30 and its supporting plate or disk 23, with the receiving-head 6 of the creaming cylinder or bowl 7, are not interfered with.

The innermost liner is made in the form of a hollow truncated pyramid 33, preferably of three sides, the said sides being provided with suitably-disposed holes or perforations 34, arranged substantially in the manner shown in Figs. 4 and 6 of the drawings. This said liner 33, as will be noticed from the drawings, is slipped over the hollow rod or pipe 30 and has its lower edge portion resting directly over the triangular rib 27 of the supporting plate or disk 23, whereby the said liner is held in position against displacement during the operation of the machine, but is capable of removal from said plate or disk 23 for cleaning purposes. When the said liner 33 surrounds the lower portion of the said rod or pipe 30, an open space is maintained at the upper end of said liner 33 with the said rod or pipe 30, as clearly illustrated in Figs. 5 and 7 of the drawings. Slipped upon the said hollow rod or pipe 30 and over the said innermost liner 33 is an intermediate liner 35, the said liner 35 being open at the top and bottom and having its lower bottom edge in detachable holding engagement with the circular rib 26 of the said holding plate or disk 23. The said intermediate liner 35 is preferably of the general configuration shown in Figs. 3, 4, and 5 of the drawings, and it consists generally of a number of annular members 36, 37, 38, 39, and 40, which are "stepped" one with the other, that they will have the appearance of a number of cylindrical bodies piled one upon the other, with the largest body at the bottom and the other cylinders being arranged that the cylinder of the smallest diameter will be at the top, as clearly shown in said Fig. 3. Connected with the said member 40, preferably by means of a shoulder 41, is a truncated cone-shaped member 42, the sides of which are preferably made convex and flare upwardly and outwardly, finally terminating in an annular cylindrical portion or member 43. The said members 37, 38, and 39 are provided with angularly-arranged corrugations or flutings 44, provided with the holes or perforations 45, the said corrugations or flutings 44 being preferably arranged as shown. The member 40 is provided with vertically-disposed corrugations or flutings 46, having holes or perforations 47, and the members 42 and 43 are provided with the angularly-arranged corrugations or flutings 48, having holes or perforations 49. The lower member 36 may also be provided with a series of holes or perforations 50. Vertically-extending slits 51 may also be provided in the member 40, said slits extending for some distance into the member or portion 42, substantially as shown. As will be seen from the said Fig. 3 of the drawings, the said liner is thus of a much smaller cross-section at and near its middle than at and near its ends, all for the purposes to be presently more fully stated. It will be understood, however, that I do not limit my invention to the general configuration of the said liner 35 as shown herein. Arranged over the said intermediate liner is an outer liner 52 of a general cylindrical configuration, comprising a series of annular and upwardly-tapering annular members 53, which are provided with an arrangement of flutings or corrugations 54, as shown in Figs. 2, 3, and 5 or as represented by the modified arrangement of corrugations or flutings shown in Figs. 10 and 11 of the drawings. The said corrugations or flutings 54 are provided with holes or perforations 55, and the adjacent members 53 are connected with each other by angular offsets formed by the annularly-corrugated and horizontally-disposed shoulders 56, as shown in said Figs. 2 and 3 of the drawings. Every alternate member 53 may be provided on diametrically opposite points of the outer surfaces of the members with ribs or projections 57, the same acting as retarders for retarding the flow of the milk and help break up the particles of the whole milk. The lower end portion of this liner 52 rests upon the supporting plate or disk 23 and is snugly fitted in the creaming cylinder or bowl 7, substantially as shown in Figs. 1 and 2 of the drawings, its upper end forming a large open space around the tubular rod or pipe 30, as illustrated in Fig. 3 of the drawings.

Instead of surrounding the lower cylindrical rib 24 of the plate or disk 23 by a gasket or washer 25 the latter may be dispensed with and the creaming cylinder or bowl may be provided with an annular interior shoulder or offset 59, upon which the edge portion of the said supporting plate or disk 23 rests and produces a joint which is sufficiently milk-tight, as represented in Fig. 9 of the drawings. In lieu of making the receiving-head 6 separate from the cylindrical body of the bowl 7 these parts may be cast in one piece, as illustrated in said Fig. 9, a receiving-socket 60 being provided, in which the upper end of the driving-shaft 3 is arranged and secured in any suitable manner, as will be clearly understood.

Having assembled the various liners in their separable relation in the creaming cylinder or bowl 7, the latter is rotated and the whole milk poured into the receiver 14. The whole milk flows through the duct 15 and the tubular rod or pipe 30 and, by means of the central hole or opening 28 in the plate or disk 23, to the under side of said plate or disk. The milk is then forced, owing to the rotary motion of the apparatus and the arrangement of the distributing-ribs 31, toward the outer marginal edge of the plate or disk. At these points a downwardly-extending lip or projection 61, contiguous to each opening or slit 29, will scoop up the milk and cause it to flow through the openings or slits 29 upon the opposite side of the said plate or disk 23 and between the outer surfaces of the sides of the pyramidal liner 35. The flat sides of the liner 33 act as dashers, and at this point the whole milk becomes broken up, some of the cream globules adhering to the sides of the liner 33 and finally finding an entrance through the holes or perforations 34 into the interior of the liner 33 to the outer surface of the rod or pipe 30. The milk, with the remaining cream globules, is dashed upon the inner and irregular surfaces of the intermediate liner 35. The milk and cream globules are thereby still more broken up, and while some of the cream globules which are separated will pass toward the outer surface of the rod or shaft 30 the milk and other particles of cream will pass through the holes or perforations in the various members of the liner 35 upon the corrugated or fluted creaming-surfaces of these parts. By the centrifugal force and the churning, dashing, and cutting or breaking-up action of the parts of the intermediate liner the milk and cream are still further separated and forced through the holes 55 upon the creaming-surfaces of the said outer liner 52. Upon the creaming-surfaces of this outer liner the milk is finally separated from any remaining cream globules, which then pass through the upper rows of holes or perforations of each section or member 53 to the inner parts of the said liners 52 and 35, as will be clearly evident. The rotary motion of the parts of the machine finally forces both the separated milk and cream to the upper portion of the bowl, where the milk is taken up by the inlet tube or tubes 20 and discharged from the outlet or exit 21 and the cream is passed through the hole or opening 12 to be discharged from the cream outlet or exit 22.

The arrangement and construction of the various devices and parts are such that a very efficient and simply-constructed and easily-operated centrifugal cream-separator is the result in which the cream and milk are most effectively separated.

It will be understood that various changes may be made in the general arrangements and combinations of the devices and parts, as well as in the details of the construction of the same, without departing from the scope of my present invention. Hence I do not limit my invention to the exact arrangements and combinations of the devices and parts as described in the forgoing specification and as illustrated in the accompanying drawings, nor do I confine myself to the exact details of the construction of the said parts.

Having thus described my invention, what I claim is—

1. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk, and a three-sided truncated pyramidal liner arranged over said rod and having its lower edge in engagement with said triangular rib, substantially as and for the purposes set forth.

2. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk, and a three-sided truncated pyramidal liner arranged over said rod and having its lower edge in engagement with said triangular rib, but said liner being separable from said disk, substantially as and for the purposes set forth.

3. A centrifugal cream-separator, comprising a bowl arranged upon a rotary shaft, a tubular rod within said bowl and rotating with the same, a supporting-disk upon the lower end portion of said rod having a central opening in communication with the interior of said rod, a truncated pyramidal liner arranged over said rod, and resting upon said disk, an intermediate liner arranged over said pyramidal liner, and an outer liner arranged over said intermediate liner, substantially as and for the purposes set forth.

4. A centrifugal cream-separator, comprising a bowl arranged upon a rotary shaft, a tubular rod within said bowl and rotating with the same, a supporting-disk upon the lower end portion of said rod having a central opening in communication with the interior of said rod, a truncated pyramidal liner arranged over said rod, and resting upon said disk, an intermediate liner arranged over said pyramidal liner, and an outer liner arranged over said intermediate liner, said liners being all of them separably connected with one another and removable from said disk and rod, substantially as and for the purposes set forth.

5. A centrifugal cream-separator, comprising a bowl arranged upon a rotary shaft, a tubular rod within said bowl and rotating with the same, a supporting-disk upon the lower end portion of said rod having a central opening in communication with the interior of said rod, a truncated pyramidal liner arranged over said rod, and resting upon said disk, said liner having perforations in its sides, an intermediate liner arranged over said pyramidal liner having a centrally-contracted portion and comprising other portions of varying cross-section, said portions being provided with perforations and corrugated creaming-surfaces, and an outer liner arranged over said intermediate liner, said outer liner comprising annularly-tapering members provided with perforations and corrugated creaming-surfaces, substantially as and for the purposes set forth.

6. A centrifugal cream-separator, comprising a bowl arranged upon a rotary shaft, a tubular rod within said bowl and rotating with the same, a supporting-disk upon the lower end portion of said rod having a central opening in communication with the interior of said rod, a truncated pyramidal liner arranged over said rod, and resting upon said disk, said liner having perforations in its sides, an intermediate liner arranged over said pyramidal liner having a centrally-contracted portion and comprising other portions being provided with perforations and corrugated creaming-surfaces, and an outer liner arranged over said intermediate liner, said outer liner comprising annularly-tapering members provided with perforations and corrugated creaming-surfaces, said liners being all of them separably connected with one another and removable from said disk and rod, substantially as and for the purposes set forth.

7. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk and a circular rib on said disk, a three-sided truncated pyramidal liner arranged over said rod and having its lower edge in engagement with said triangular rib, an intermediate liner arranged over said pyramidal liner and having its lower edge in engagement with said circular rib, and an outer liner arranged over said intermediate liner, substantially as and for the purposes set forth.

8. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk and a circular rib on said disk, a three-sided truncated pyramidal liner arranged over said rod and having its lower edge in engagement with said triangular rib, an intermediate liner arranged over said pyramidal liner and having its lower edge in engagement with said circular rib, and an outer liner arranged over said intermediate liner, said liners being all of them separably connected with one another and removable from said disk and rod, substantially as and for the purposes set forth.

9. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk and a circular rib on said disk, a three-sided truncated pyramidal liner arranged over said rod and having its lower edge in engagement with said triangular rib, said liner having perforations in its sides, an intermediate liner arranged over said pyramidal liner and having its lower edge in engagement with said circular rib, said intermediate liner having a centrally-contracted portion and comprising other portions of varying cross-section, said portions being provided with perforations and corrugated creaming-surfaces, and an outer liner arranged over said intermediate liner comprising annularly-tapering members provided with perforations and creaming-surfaces, substantially as and for the purposes set forth.

10. A centrifugal cream-separator, comprising a bowl arranged upon a rotary shaft, a tubular rod within said bowl and rotating with the same, a supporting-disk upon the lower end portion of said rod having a central opening in communication with the interior of said rod, a triangular rib on said disk and a circular rib on said disk, a three-sided truncated pyramidal liner arranged over said rod and having its lower edge in engagement with said triangular rib, said liner having perforations in its sides, an intermediate liner arranged over said pyramidal liner and having its lower edge in engagement with said circular rib, said intermediate liner having a centrally-contracted portion and comprising other portions of varying cross-section, said portions being provided with perforations and corrugated creaming-surfaces, and an outer liner arranged over said intermediate liner comprising annularly-tapering members provided with perforations and creaming-surfaces, said liners being all of them separably connected with one another and removable from said disk and rod, substantially as and for the purposes set forth.

11. In a centrifugal cream-separator, a liner comprising a centrally-contracted portion, and step-shaped end members enlarging toward the opposite ends of the liner, all made in one integral piece, said portions being provided with perforations and corrugated creaming-surfaces, substantially as and for the purposes set forth.

12. In a centrifugal cream-separator, a liner comprising a centrally-contracted member 40, a series of cylindrical members 36, 37, 38 and 39 of varying cross-section, and a truncated and inverted-cone-shaped member 42, said members 40, 37, 38, 39 and 42 being provided with perforations and corrugated creaming-surfaces, substantially as and for the purposes set forth.

13. In a centrifugal cream-separator, a liner comprising a cylindrically-shaped body open at its opposite ends, said body consisting of a number of connected annularly-tapering members, said members being provided with annular horizontal shoulders, and each member being provided with perforations and corrugated creaming-surfaces, substantially as and for the purposes set forth.

14. In a centrifugal cream-separator, a liner comprising a cylindrically-shaped body open at its opposite ends, said body consisting of a number of connected annularly-tapering members, each member being provided with perforations and corrugated creaming-surfaces, and retarding-ribs upon the outer surfaces of said tapering members, substantially as and for the purposes set forth.

15. In a centrifugal cream-separator, a tubular rod, and a supporting-disk on said rod, said disk having a central opening in communication with the interior of said rod, and said disk being provided near its outer marginal edge with elongated and radially-disposed openings, substantially as and for the purposes set forth.

16. In a centrifugal cream-separator, a tubular rod, and a supporting-disk on said rod, said disk having a central opening in communication with the interior of said rod, said disk being provided near its outer marginal edge with elongated and radially-disposed openings, and a downwardly-extending lip contiguous to each opening, substantially as and for the purposes set forth.

17. In a centrifugal cream-separator, a tubular rod, and a supporting-disk on said rod, said disk having a central opening in communication with the interior of said rod, and radially-disposed deflecting-ribs extending downwardly from the under side of said disk, substantially as and for the purposes set forth.

18. In a centrifugal cream-separator, a tubular rod, and a supporting-disk on said rod, said disk having a central opening in communication with the interior of said rod, and radially-disposed deflecting-ribs extending downwardly from the under side of said disk, said disk being provided near its outer marginal edge with openings, substantially as and for the purposes set forth.

19. In a centrifugal cream-separator, a tubular rod, and a supporting-disk on said rod, said disk having a central opening in communication with the interior of said rod, and deflecting-ribs extending downwardly from the under side of said disk, said disk being provided near its outer marginal edge with openings, and a downwardly-extending lip contiguous to each opening, substantially as and for the purposes set forth.

20. In a centrifugal cream-separator, the combination, with a bowl and its receiving-head, of a tubular rod in said bowl, a supporting-disk on said rod having a central opening in communication with the interior of said rod, and a packing device between the lower surface of said disk and upper surface of said receiving-head, substantially as and for the purposes set forth.

21. In a centrifugal cream-separator, the combination, with a bowl and its receiving-head, of a tubular rod in said bowl, a supporting-disk on said rod having a central opening in communication with the interior of said rod, an annular rib on the lower surface of said disk, said rib resting upon said receiving-head, and a gasket or packing-ring encircling said rib, substantially as and for the purposes set forth.

In testimony that I claim the invention set forth above I have hereunto set my hand this 22d day of March, 1905.

JOHN LAURELL.

Witnesses:
    FREDK. C. FRAENTZEL,
    FRANK E. LARSON.